United States Patent
Zhu

(10) Patent No.: US 9,665,212 B2
(45) Date of Patent: May 30, 2017

(54) 3D INFRARED TOUCH SYSTEM AND TERMINAL THEREOF

(71) Applicant: HuiZhou TCL Mobile Communication Co., Ltd., HuiZhou (CN)

(72) Inventor: Jianfeng Zhu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 14/909,466

(22) PCT Filed: Jul. 24, 2015

(86) PCT No.: PCT/CN2015/085042
§ 371 (c)(1),
(2) Date: Feb. 2, 2016

(87) PCT Pub. No.: WO2016/123929
PCT Pub. Date: Aug. 11, 2016

(65) Prior Publication Data
US 2016/0306500 A1    Oct. 20, 2016

(30) Foreign Application Priority Data
Feb. 6, 2015  (CN) .......................... 2015 1 0062728

(51) Int. Cl.
*G09G 1/00*    (2006.01)
*G06F 3/042*    (2006.01)
*G06F 3/041*    (2006.01)

(52) U.S. Cl.
CPC .......... *G06F 3/0421* (2013.01); *G06F 3/0412* (2013.01); *G06F 3/0416* (2013.01); *G06F 2203/04101* (2013.01)

(58) Field of Classification Search
CPC ........ G06F 1/00; G06F 3/0412; G06F 3/0416; G06F 3/044; G06F 3/0488; G09G 1/00
See application file for complete search history.

(56) References Cited

U.S. PATENT DOCUMENTS

2003/0063115 A1    4/2003  Kaku et al.
2013/0076694 A1*   3/2013  Yeh ........................ G06F 3/0428
                                                              345/175

FOREIGN PATENT DOCUMENTS

CN    101403952    4/2009
CN    103019462    4/2013
CN    104657003    5/2015

* cited by examiner

*Primary Examiner* — Michael Faragalla

(57) ABSTRACT

A 3D (Three-Dimensional) infrared touch system includes an infrared module for establishing two layers of infrared nets over a display device for sensing a user touch operation; and an infrared recognition module for recognizing the user touch operation sensed by the two layers of infrared nets. 3D touch is carried out by virtue of the infrared and as such, it is easy to be compatible with large-sized and oversized terminals. 3D touch for large-sized terminals is realized and great convenience is brought to the users.

12 Claims, 1 Drawing Sheet

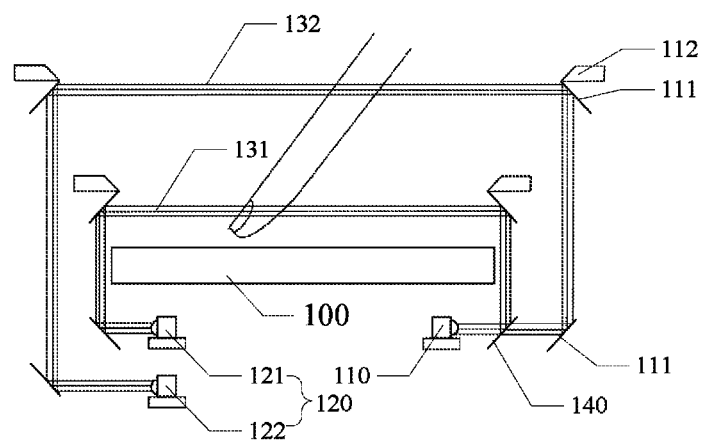

3D INFRARED TOUCH SYSTEM AND TERMINAL THEREOF

RELATED APPLICATIONS

This application is a National Phase of PCT Patent Application No. PCT/CN2015/085042 having International filing date of Jul. 24, 2015, which claims the benefit of priority of Chinese Patent Application No. 201510062728.1 filed on Feb. 6, 2015. The contents of the above applications are all incorporated by reference as if fully set forth herein in their entirety.

FIELD AND BACKGROUND OF THE INVENTION

The present invention relates to a 3D (Three-Dimensional) touch technology, and more particularly, to a 3D infrared touch system and a terminal thereof.

With the development of mobile terminals, an idea of "3D touch" is proposed and is increasingly welcome to the users. However, the existing 3D touch technologies are all restricted to image recognition and are realized by powerful capacitive sensing. The image recognition involves 3D imaging and motion recognition. The cost is very expensive and the principle is very complicated. The capacitive touch sensing can carry out so-called 3D hovering. However, the capacitive sensing is limited. The capacitive sensing ability depends on the dielectric constant of a contact object and the driving power per se. Therefore, the hovering distance at present is generally at most 3 cm. In addition, due to the limitation of driving power also, the capacitive touch sensing is not applicable to large-sized terminals and cannot carry out large scale hovering touch control.

Therefore, the existing skills need to be improved.

SUMMARY OF THE INVENTION

The technical problems to be solved in the present invention are that the existing 3D touch technology is not applicable to large-sized terminals and its cost is high. For the drawbacks in the existing skills, the present invention provides a 3D infrared touch system and a terminal thereof for solving the aforesaid technical problems.

To solve above technical problems, the technical schemes provided by the present invention are described below.

The embodiment of the present invention provides a 3D (Three-Dimensional) infrared touch system, comprising: an infrared module for establishing two layers of infrared nets over a display device of a terminal for sensing a user touch operation; and an infrared recognition module for recognizing the user touch operation sensed by the two layers of infrared nets including a first infrared net and a second infrared net; wherein the infrared module comprises: an infrared ray transmitting unit comprising one row of infrared ray transmitters for transmitting infrared rays; an infrared ray receiving unit comprising two rows of infrared ray receivers for receiving the infrared rays, the two rows of infrared ray receivers including a first row of infrared ray receivers and a second row of infrared ray receivers; a plurality of total reflection light guide plates for reflecting the infrared rays; and a transflective light guide plate; wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and wherein the second infrared net is established over the display device by the infrared rays, which are transmitted by the infrared ray transmitters, pass the transflective light guide plate, and then are reflected to the second row of infrared ray receivers in turn via the plural total reflection light guide plates; and wherein the first infrared net is nearer to the display device than the second infrared net.

In the 3D infrared touch system of the present invention, the total reflection light guide plates are disposed on a front cover of the terminal.

In the 3D infrared touch system of the present invention, the infrared ray transmitters comprise infrared LED (Light Emitting Diode) transmitters.

In the 3D infrared touch system of the present invention, the infrared recognition module comprises a micro control unit (MCU).

The embodiment of the present invention further provides a 3D (Three-Dimensional) infrared touch system, comprising: an infrared module for establishing two layers of infrared nets over a display device for sensing a user touch operation; and an infrared recognition module for recognizing the user touch operation sensed by the two layers of infrared nets.

In the 3D infrared touch system of the present invention, the infrared module comprises: an infrared ray transmitting unit for transmitting infrared rays; an infrared ray receiving unit for receiving the infrared rays; and a plurality of total reflection light guide plates for reflecting the infrared rays; wherein the two layers of infrared nets are established over the display device by the infrared rays, which are transmitted by the infrared ray transmitting unit, reflected to the infrared ray receiving unit by the plural total reflection light guide plates, and received by the infrared ray receiving unit.

In the 3D infrared touch system of the present invention, the two layers of infrared nets include a first infrared net and a second infrared net, and the first infrared net is nearer to the display device than the second infrared net.

In the 3D infrared touch system of the present invention, the infrared module further comprises a transflective light guide plate; the infrared ray transmitting unit comprises one row of infrared ray transmitters; and the infrared ray receiving unit comprises two rows of infrared ray receivers, which include a first row of infrared ray receivers and a second row of infrared ray receivers; and wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and wherein the second infrared net is established over the display device by the infrared rays, which are transmitted by the infrared ray transmitters, pass the transflective light guide plate, and then are reflected to the second row of infrared ray receivers in turn via the plural total reflection light guide plates.

In the 3D infrared touch system of the present invention, the infrared ray transmitters comprise infrared LED (Light Emitting Diode) transmitters.

The embodiment of the present invention further provides a terminal comprising a 3D (Three-Dimensional) infrared touch system, said 3D infrared touch system comprising: an infrared module for establishing two layers of infrared nets over a display device for sensing a user touch operation; and an infrared recognition module for recognizing the user touch operation sensed by the two layers of infrared nets.

In the terminal of the present invention, the infrared module comprises: an infrared ray transmitting unit for transmitting infrared rays; an infrared ray receiving unit for receiving the infrared rays; and a plurality of total reflection light guide plates for reflecting the infrared rays; wherein the two layers of infrared nets are established over the display device by the infrared rays, which are transmitted by the infrared ray transmitting unit, reflected to the infrared ray receiving unit by the plural total reflection light guide plates, and received by the infrared ray receiving unit.

In the terminal of the present invention, the infrared ray transmitting unit comprises two rows of infrared ray transmitters and the infrared ray receiving unit comprises two rows of infrared ray receivers.

In the terminal of the present invention, the two layers of infrared nets include a first infrared net and a second infrared net, and the first infrared net is nearer to the display device than the second infrared net.

In the terminal of the present invention, the infrared module further comprises a transflective light guide plate; the infrared ray transmitting unit comprises one row of infrared ray transmitters; and the infrared ray receiving unit comprises two rows of infrared ray receivers, which include a first row of infrared ray receivers and a second row of infrared ray receivers; and wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and wherein the second infrared net is established over the display device by the infrared rays, which are transmitted by the infrared ray transmitters, pass the transflective light guide plate, and then are reflected to the second row of infrared ray receivers in turn via the plural total reflection light guide plates.

In the terminal of the present invention, the infrared ray transmitters comprise infrared LED (Light Emitting Diode) transmitters.

The 3D infrared touch system and the terminal provided in the present invention effectively solves the problems that the existing 3D touch technology is not applicable to large-sized terminals and its cost is high. The 3D infrared touch system comprises an infrared module for establishing two layers of infrared nets over a display device for sensing a user touch operation; and an infrared recognition module for recognizing the user touch operation sensed by the two layers of infrared nets. 3D touch is carried out by virtue of the infrared and as such, it is easy to be compatible with large-sized and oversized terminals and suffer less external electromagnetic interference. The light transmittance of a screen is high, the cost is low, and the practicability is high. 3D touch for large-sized terminals is realized and great convenience is brought to the users.

BRIEF DESCRIPTION OF THE SEVERAL VIEWS OF THE DRAWINGS

FIG. 1 is a schematic structural diagram showing a 3D infrared touch system in accordance with a preferred embodiment of the present invention.

DESCRIPTION OF SPECIFIC EMBODIMENTS OF THE INVENTION

The present invention provides a 3D (Three-Dimensional) infrared touch system and a terminal thereof. To make the objectives, technical schemes, and effects of the present invention more clear and specific, the present invention is described in further detail below with reference to the embodiments in accompanying with drawings. It should be understood that the specific embodiments described herein are merely for explaining the present invention and the present invention is not limited thereto.

Please refer to FIG. 1, which is a schematic structural diagram showing a 3D infrared touch system in accordance with a preferred embodiment of the present invention. As shown in FIG. 1, the 3D infrared touch system comprises an infrared module and an infrared recognition module. The infrared module is used for establishing two layers of infrared nets over a display device 100 for sensing a user touch operation. The infrared recognition module is used for recognizing the user touch operation sensed by the two layers of infrared nets. The infrared module is connected to the infrared recognition module.

Specifically, the infrared module comprises an infrared ray transmitting unit 110 for transmitting infrared rays, an infrared ray receiving unit 120 for receiving the infrared rays, and a plurality of total reflection light guide plates 111 for reflecting the infrared rays. The infrared rays transmitted by the infrared ray transmitting unit 110 are reflected to the infrared ray receiving unit 120 by the plural total reflection light guide plates 111 and are received by the infrared ray receiving unit 120, and also establish the two layers of infrared nets over the display device 100. The infrared recognition module is connected to the infrared ray receiving unit 120. The two layers of infrared nets include a first infrared net 131 and a second infrared net 132, and the first infrared net 131 is nearer to the display device 100 than the second infrared net 132. That is, the display device 100, the first infrared net 131, and the second infrared net 132 are arranged or deployed in order. As shown in FIG. 1, an individual infrared net can be established over the display device 100 by the infrared rays, which are transmitted by the infrared ray transmitting unit 110 and reflected by the plural total reflection light guide plates 111, and the infrared rays are then reflected to the infrared ray receiving unit 100 by the plural total reflection light guide plates 111. When the infrared net is touched by a user's finger, the infrared signal is interrupted. By use of this principle, the infrared recognition module connecting to the infrared ray receiving unit 120 can realize the recognition.

In conventional skills, a conventional infrared touch technology constructs an infrared net of a rectangular structure by using an arrangement of infrared ray transmitters and corresponding infrared ray receivers. In this deployment, the signals received by the infrared ray receivers from two directions on the plane of the infrared net suffer from attenuation when a user's finger intersects the infrared net. In this way, the coordinates of the user's finger can be calculated by use of the infrared recognition module such as MCU (Micro Control Unit) and the system can response to the user touch as well. This is the existing 2D (Two-Dimensional) touch technology. In accordance with the present invention, the 3D touch control scheme adopts two sets of 2D infrared touch control systems and establishes two layers of infrared nets for proceeding with 3D touch recognition. It is easy to be compatible with large-sized and oversized terminals for the 3D infrared touch control scheme and it suffers less external electromagnetic interference. The light transmittance of a screen is high, the cost is low, and the practicability is high. 3D touch for large-sized terminals is realized. Furthermore, not only is a hovering largescale operation performed to a distanced screen (compared to a capacitive sensing touch technology) carried out, but the cost of 3D touch is also reduced.

In practical applications, the infrared ray transmitting unit 110 may comprise two rows of infrared ray transmitters and the infrared ray receiving unit 120 may comprise two rows of infrared ray receivers. Please continue referring to FIG. 1. To reduce the volume of the terminal and the cost thereof, the infrared module further comprises a transflective light guide plate 140, the infrared ray transmitting unit 110 comprises one row of infrared ray transmitters, and the infrared ray receiving unit 120 comprises two rows of infrared ray receivers including a first row of infrared ray receivers 121 and a second row of infrared ray receivers 122. The first infrared net 131 is established over the display device 100 by the infrared rays, which are transmitted by the infrared ray transmitters, reflected by the transflective light guide plate 140, and then reflected to the first row of infrared ray receivers 121 in turn via the plural total reflection light guide plates 111. The second infrared net 132 is established over the display device 100 by the infrared rays, which are transmitted by the infrared ray transmitters, pass the transflective light guide plate 140, and then are reflected to the second row of infrared ray receivers 122 in turn via the plural total reflection light guide plates 111.

Specifically, the transflective light guide plate 140 is a transflective film, which can reflect the infrared rays and can also let the infrared rays pass through, and thus two beams of infrared rays can be formed. Establishing two infrared nets together with use of two rows of infrared ray receivers at the terminal can save a half number of infrared ray transmitters, and this reduces the volume of the terminal and the cost as well.

In practical applications, the signal points on the two infrared nets are interrupted when a finger touches the user interface (UI). The second infrared net can be served for detecting a hovering or floating 3D operation to carry out practical 3D operations in a specific software. As illustrated below, both of the first infrared net and the second infrared net can be normally used for 2D operations. Particularly, hovering touch sensing is realized by using the second infrared net. Sensing the motions in the Z direction (perpendicular to the screen of the display device of the terminal) may require to monitor the touches on two surfaces. It indicates a driving action when the second infrared net is touched by a finger and it indicates a triggering action when the first infrared net has been touched. Taking Google Earth for example, the finger is placed on the second infrared net for preparing to do the triggering action (e.g., transverse or longitudinal sliding in case of confusion occurred when the hand moves away) and meanwhile the first infrared net has not been triggered, and then the finger moves forward to trigger the first infrared net, constructing a forward gesture.

Similarly, if the finger is placed on the first infrared net and triggers the same, it will be determined whether the finger is first placed on the first infrared net and then moves away from the second infrared net. If yes, this constructs a backward pull action, and an action performed along a 3D vertical (Z) direction is determined.

In practical applications, the total reflection light guide plates 111 are disposed on a front cover 112 of the terminal. The infrared ray transmitters comprise infrared LED (Light Emitting Diode) transmitters.

Based on the aforesaid 3D infrared touch system, the present invention further provides a terminal comprising the aforesaid 3D infrared touch system. The terminal may be a mobile terminal such as a mobile phone and a tablet.

Above all, the 3D infrared touch system and the terminal provided in the present invention comprise an infrared module for establishing two layers of infrared nets over a display device for sensing a user touch operation; and an infrared recognition module for recognizing the user touch operation sensed by the two layers of infrared nets. 3D touch is carried out by virtue of the infrared and as such, it is easy to be compatible with large-sized and oversized terminals and suffer less external electromagnetic interference. The light transmittance of a screen is high, the cost is low, and the practicability is high. 3D touch for large-sized terminals is realized and great convenience is brought to the users.

It should be understood that the application of the present invention is not limited to the above-described examples. Those of ordinary skill in the art may make modifications or variations according to the above descriptions, but all such modifications and variations should be within the scope of the appended claims.

What is claimed is:

1. A 3D (Three-Dimensional) infrared touch system, comprising:
an infrared module for establishing two layers of infrared nets over a display device of a terminal for sensing a user touch operation; and
an infrared recognition module for recognizing the user touch operation sensed by the two layers of infrared nets including a first infrared net and a second infrared net;
wherein the infrared module comprises:
an infrared ray transmitting unit comprising one row of infrared ray transmitters for transmitting infrared rays;
an infrared ray receiving unit comprising two rows of infrared ray receivers for receiving the infrared rays, the two rows of infrared ray receivers including a first row of infrared ray receivers and a second row of infrared ray receivers;
a plurality of total reflection light guide plates for reflecting the infrared rays; and
a transflective light guide plate;
wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and
wherein the second infrared net is established over the display device by the infrared rays, which are transmitted by the infrared ray transmitters, pass the transflective light guide plate, and then are reflected to the second row of infrared ray receivers in turn via the plural total reflection light guide plates; and
wherein the first infrared net is nearer to the display device than the second infrared net.

2. The 3D infrared touch system according to claim 1, wherein the total reflection light guide plates are disposed on a front cover of the terminal.

3. The 3D infrared touch system according to claim 1, wherein the infrared ray transmitters comprise infrared LED (Light Emitting Diode) transmitters.

4. The 3D infrared touch system according to claim 1, wherein the infrared recognition module comprises a micro control unit (MCU).

5. A 3D (Three-Dimensional) infrared touch system, comprising:
an infrared module for establishing two layers of infrared nets over a display device for sensing a user touch operation; and
an infrared recognition module for recognizing the user touch operation sensed by the two layers of infrared nets;

wherein the infrared module comprises:
an infrared ray transmitting unit comprising one row of infrared ray transmitters for transmitting infrared rays;
an infrared ray receiving unit comprising two rows of infrared ray receivers for receiving the infrared rays;
a plurality of total reflection light guide plates for reflecting the infrared rays; and
a transflective light guide plate;
wherein the infrared rays transmitted by the infrared ray transmitters are reflected by the transflective light guide plate and then are reflected to one of the two rows of infrared ray receivers in turn via the plural total reflection light guide plates; and
wherein the infrared rays transmitted by the infrared ray transmitters pass the transflective light guide plate and then are reflected to the other one of the two rows of infrared ray receivers in turn via the plural total reflection light guide plates.

6. The 3D infrared touch system according to claim 5, wherein the two layers of infrared nets include a first infrared net and a second infrared net, and the first infrared net is nearer to the display device than the second infrared net.

7. The 3D infrared touch system according to claim 6, wherein the two rows of infrared ray receivers include a first row of infrared ray receivers and a second row of infrared ray receivers; and
wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and
wherein the second infrared net is established over the display device by the infrared rays, which are transmitted by the infrared ray transmitters, pass the transflective light guide plate, and then are reflected to the second row of infrared ray receivers in turn via the plural total reflection light guide plates.

8. The 3D infrared touch system according to claim 5, wherein the infrared ray transmitters comprise infrared LED (Light Emitting Diode) transmitters.

9. A terminal comprising a 3D (Three-Dimensional) infrared touch system, said 3D infrared touch system comprising:
an infrared module for establishing two layers of infrared nets over a display device for sensing a user touch operation; and
an infrared recognition module for recognizing the user touch operation sensed by the two layers of infrared nets;
wherein the infrared module comprises:
an infrared ray transmitting unit comprising one row of infrared ray transmitters for transmitting infrared rays;
an infrared ray receiving unit comprising two rows of infrared ray receivers for receiving the infrared rays;
a plurality of total reflection light guide plates for reflecting the infrared rays; and
a transflective light guide plate;
wherein the infrared rays transmitted by the infrared ray transmitters are reflected by the transflective light guide plate and then are reflected to one of the two rows of infrared ray receivers in turn via the plural total reflection light guide plates; and
wherein the infrared rays transmitted by the infrared ray transmitters pass the transflective light guide plate and then are reflected to the other one of the two rows of infrared ray receivers in turn via the plural total reflection light guide plates.

10. The terminal according to claim 9, wherein the two layers of infrared nets include a first infrared net and a second infrared net, and the first infrared net is nearer to the display device than the second infrared net.

11. The terminal according to claim 10, wherein the two rows of infrared ray receivers include a first row of infrared ray receivers and a second row of infrared ray receivers; and
wherein the first infrared net is established over the display device by the infrared rays, which are transmitted by the infrared ray transmitters, reflected by the transflective light guide plate, and then reflected to the first row of infrared ray receivers in turn via the plural total reflection light guide plates; and
wherein the second infrared net is established over the display device by the infrared rays, which are transmitted by the infrared ray transmitters, pass the transflective light guide plate, and then are reflected to the second row of infrared ray receivers in turn via the plural total reflection light guide plates.

12. The terminal according to claim 9, wherein the infrared ray transmitters comprise infrared LED (Light Emitting Diode) transmitters.

* * * * *